March 1, 1932. A. JOHNSON 1,848,015
MANUFACTURE OF WATER GAS
Filed Jan. 28, 1925
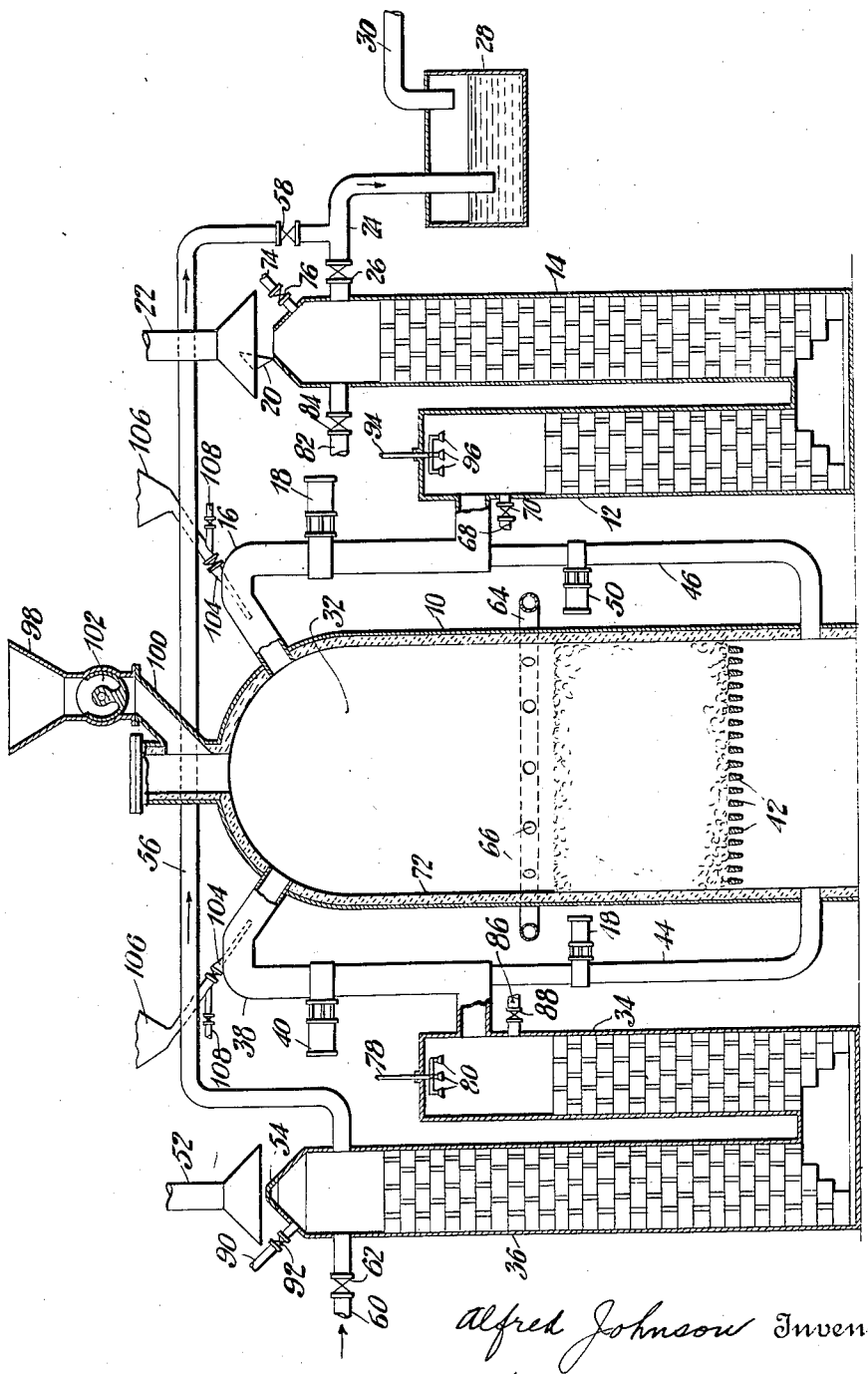
Alfred Johnson Inventor
By His Attorney
Edmund G. Borden Patented Mar. 1, 1932

1,848,015

UNITED STATES PATENT OFFICE

ALFRED JOHNSON, OF WESTERLEIGH, NEW YORK, ASSIGNOR TO COMBUSTION UTILITIES CORPORATION, OF NEW YORK, N. Y., A CORPORATION OF MAINE

MANUFACTURE OF WATER GAS

Application filed January 28, 1925. Serial No. 5,245.

This invention relates to the manufacture of water gas, and more particularly to an improved method and apparatus for making carburetted water gas from anthracite, coke and bituminous coals.

Most of the water gas made according to modern practice is produced in a standard set of apparatus consisting of a gas generator connected in series with carburetor and superheater regenerative elements. The usual plan of operation is to alternate periods of air blasting, during which the temperature of a bed of fuel in the generator is raised to incandescence, with gas making "runs", during which steam is passed through the incandescent fuel to generate water gas. The lean or "blow" gas produced in the generator during periods of air blasting is passed into the top of the carburetor and burned therein with secondary air, and the products of combustion, after imparting heat to the refractory fillings of the carburetor and superheater, are exhausted into the atmosphere, often while still at red heat, through a stack at the top of the superheater. During the gas making "runs" the water gas produced is passed into the carburetor and a spray of oil at the top of the carburetor is simultaneously turned on. The high degree of preheat imparted to the refractory linings of the carburetor and superheater during the "blow" cycle vaporizes the oil and transforms its vapors into fixed gaseous hydrocarbons. These hydrocarbons are swept along with the stream of water gas through the carburetor and superheater and serve as enriching agents whereby the calorific value of the final gaseous product is considerably increased.

In order to support the enrichment, or carburetion of the water gas with gaseous hydrocarbons, derived preferably from mineral oil, it is necessary to generate a high degree of preheat in both the carburetor and the superheater during the "blow", because the water gas as it leaves the ordinary generator does not itself carry sufficient sensible heat to effect the vaporization of the carburetting oil and the fixation of the oil vapors in the gaseous state. As a result of these high temperatures in the carburetor and superheater linings the enriched water gas generally carries superheat as it exits from the top of the superheater into the foul gas main, and accordingly this heat is lost to the gas making operation and materially increases the demands on the condensing and scrubbing equipment.

Attempts have been made to increase the thermal efficiency of the standard water gas process by adding to the standard set of apparatus additional preheaters and/or waste heat boilers in which to recover and utilize the potential heat remaining in the blow gases as they leave the top of the superheater. Despite these attempts, however, so far as known no process and apparatus for water gas manufacture has been developed which will operate satisfactorily on a substantially balanced thermal cycle and with an efficient recovery and utilization of the heat developed in the generator.

The primary object of the present invention is to provide an improved process and apparatus by means of which the manufacture of water gas from anthracite, coke or bituminous fuels can be conducted on a substantially balanced thermal plan or cycle.

Another object of the invention is to provide a process and apparatus by means of which the manufacture of water gas from anthracite, coke or bituminous coals can be conducted with a relatively high thermal efficiency and at a relatively low cost.

In accordance with these objects one feature of the present invention contemplates regenerating substantially all of the potential heat of the blow gases and storing the heat thus regenerated at points where it can be effectively utilized in carburetting the make gas with hydrocarbon oils, in generating and superheating the make steam, and in preheating the blast air.

Another feature of the invention contemplates regenerating the sensible heat of the enriched water gas and making effective use of the heat thus regenerated.

Another feature of the invention contemplates regenerating heat from the waste fuel and ash before its discharge from the generator.

Another feature of the invention contemplates improvements in process and relatively simple alterations and additions to the standard set of apparatus by means of which heat regenerated from the blow gases, from the make gases and from the waste fuel can be utilized to preheat air for the "blow", to generate and superheat steam for the "run", and to superheat and support carburetion of the make gas with gaseous hydrocarbons, thereby leading to operation on a substantially balanced thermal cycle.

Another object of the present invention is to provide an improved process and apparatus for water gas manufacture by means of which the amount of heat normally carried over from the generator into carburetor and superheater elements by the blow gases can be materially reduced.

With this object in view another feature of the invention contemplates recovering and storing a part of the potential heat of the blow gases within the generator and fuel bed and using the heat thus stored to support the carburetion of the make gases with gaseous hydrocarbons.

With these and other objects and features in view, the invention consists in the improved method of and apparatus for making water gas hereinafter described and particularly defined in the claims.

The various features of the invention are illustrated in the accompanying drawing, in which:

The view is a front vertical section, with parts in elevation, showing the improved water gas generator and the auxiliary carburetors, superheaters, and connections which embody the preferred form of the invention.

The equipment illustrated in the drawing consists of any standard water gas generator set including a water gas generator 10, a carburetor 12, and a superheater 14, together with the auxiliary equipment incident thereto. This auxiliary equipment includes a gas connection 16 and hot valve 18 between the top of the generator and the top of the carburetor, an exhaust valve 20 and stack 22 at the top of the superheater, a rich gas offtake 24 with valve 26 leading from the top of the superheater into a seal pot 28, and a foul gas main 30 leading from the seat pot preferably to condensing and scrubbing equipment (not shown).

Added to this equipment is a combustion chamber 32 at the top of the generator, formed by raising the top of a standard gas generator and installing a ring-sheet or radiation arch to create additional space above the fuel bed of the generator for secondary combustion of the blow gases. A supplemental carburetor unit 34 and a supplemented superheater unit 36, resembling in design and construction the carburetor 12 and superheater 14 of the standard set respectively, are connected in series to the space above the fuel bed by a pipe 38 with hot valve 40. The supplemental or auxiliary carburetor 34 and the standard carburetor 12 are both connected to the space in the generator below grate bars 42 by means of connections and hot valves numbered respectively 44 and 46, and 48 and 50. The auxiliary superheater 36 is equipped with a stack 52 and a stack valve 54, and a gas offtake line 56 with valve 58 leads from the top of this superheater into main offtake 24 at the entrance end of seal pot 28. The supplemental carburetor and superheater are provided with auxiliary equipment resembling the auxiliary equipment of the existing carburetor and superheater, in order that in operation they will perform the same functional duties.

The process of water gas manufacture constituting the preferred form of the present invention is carried out in the arrangement of apparatus illustrated in the drawing substantially as follows:

Primary air is admitted through an inlet 60 and valve 62 into the top of auxiliary superheater 36. Superheater 36 and carburetor 34 having been previously heated by the passage of hot make gases or by the combustion of blow gas therein, the air in passing down through superheater 36 and upwardly through carburetor 34 takes up preheat by heat exchange with the checker brick linings and is thence passed through hot valve 48 and conduit 44 into the base of the generator below the grate bars 42. The lean or blow gases produced in the fuel bed by the upward passage of the air therethrough enter the combustion chamber 32 and are met by secondary air, either preheated or cold, which is admitted into the combustion chamber simultaneously from a bustle pipe 64 through a number of nostrils 66. The amount of secondary air admitted through nostrils 66 may or may not be sufficient to completely burn the blow gases. Any unburned blow gases pass out with the products of combustion through connection 16 and hot valve 18, and enough secondary air is admitted at the top of the carburetor 12 through an inlet 68 and valve 70 to complete their combustion. The products of secondary combustion pass downwardly through the refractory lining of carburetor 12 and upwardly through superheater 14, and are thence exhausted through exit valve 20 and stack 22. The radiation arch which forms combustion chamber 32 has a high temperature refractory lining 72 which serves to project heat liberated by the secondary combustion of the blow gases downwardly as radiant energy into the top layers of the bed of fuel below the secondary air inlets 66, and the heat thus radiated is stored in the top layers of the fuel bed and is used for superheating generated water gas and for completing decomposition of the steam during the subsequent run.

After the temperature of the bed of fuel in the generator has been raised by the blast air sufficiently to support the endothermic water gas reactions the air is cut off by closing valve 62. The blow cycle is followed by a gas making run during which stack valve 20 at the top of the superheater 14 is closed and steam, or preferably water, is admitted into the top of the superheater through an inlet 74, controlled by valve 76. The water is transformed almost instantly into steam on striking the hot checker-brick lining of the superheater, and as this steam passes downwardly through the refractory filling of the superheater and upwardly through the refractory filling of carburetor 12, it continues to absorb heat from the refractory and is superheated at the time it exits from the top of the carburetor. During a part or all of the make run the superheated steam is admitted into the base of the generator through conduit 46, by opening valve 50 and closing valve 18 in conduit 16. However, in case at any time a "down run" is desirable hot valve 50 may be closed, and hot valve 18 may be opened to admit the superheated steam into the combustion chamber 32 at the top of the generator. The steam admitted at the base of the generator through conduit 46 passes up through the grate bars 42 and through the incandescent fuel supported thereon, and the water gas thereby produced passes upwardly through the hot upper layers of the fuel bed into the combustion chamber 32, at the same time becoming highly superheated by absorption of some of the radiant heat projected into the top layers of the fuel bed during the previous air blast cycle. The highly superheated water gas produced during this up run is then passed out of the generator through conduit 38, by opening valve 40, and enters the top of the comparatively cold supplemental carburetor 34. To enrich the water gas at this point carburetting oils, preferably of mineral origin, are introduced into the current of hot water gas through supply pipe 78 and distributors 80. The high degree of superheat carried by the current of water gas entering the carburetor is sufficient to support almost instantaneous vaporization and "fixation" of the hydrocarbon components of the carburetting oil, and the rich gaseous hydrocarbons are then picked up and carried along with the current of water gas downwardly through the checker-brick filling of carburetor 34, upwardly through the filling of superheater 36 and thence out through offtake conduit 56 and valve 58 into seal pot 28, at the head of the foul gas main 30. The temperature of the refractory fillings of carburetor 34 and superheater 36 having been previously reduced by heat transfer with the blast air, these fillings take up a substantial part of the sensible heat of the enriched water gas as it passes therethrough, so that the water gas exits from the top of the superheater 36 at a relatively low temperature. Whenever the generator is operated on a "down run," i. e. by admitting make steam through connection 16 and passing it downwardly through combustion chamber 32 into the top of the fuel bed, this down run steam takes on an extremely high degree of superheat and is substantially completely decomposed at the time it enters the fuel column by absorption of heat derived from radiant energy stored in the top of the generator and fuel column during the previous blast cycle. As a result the water gas produced during the down run has an extremely low moisture content, and since it leaves the fuel column through the hottest part of the blast zone adjacent grates 42, it also carries a much higher degree of superheat than is generally carried by water gas produced in the ordinary way. This hot, dry water gas leaves the base of the generator through conduit 44 and is passed by hot valve 48, (valve 40 in conduit 38 being closed), into the top of the carburetor 34. The water gas produced during the down run has a sufficiently high degree of superheat and a sufficiently low moisture content to support its own enrichment by carburetion with oil admitted through pipe 78 and distributors 80, so that the rich gas mixture produced during the down runs may be likewise cooled in carburetor 34 and superheater 36 before its exits through conduit 56, and possesses substantially the same properties and has substantially the same chemical analysis as gas produced and enriched during the up run.

After the temperature of the fuel bed in the generator has been lowered by the endothermic water gas reactions below that temperature at which substantially dry gas can be produced, the flow of steam is cut off by closing valve 76 and hot valve 18. The gas making run is followed by another blow cycle during which the blast air and the exhaust blow gases are passed through the apparatus in a direction opposite to that taken by the blast air and the blow gases during the previous "blow." During this "blow" air is admitted through inlet 82, by opening valve 84, into the top of superheater 14, and during its passage downward through the superheater and upwardly through the refractory fillings of carburetor 12, the air takes up a good part of the heat remaining in the refractory fillings after the steam generating and superheating operation of the prior water gas cycle. This preheated air is then passed by hot valve 50 through conduit 46 into the base of the generator below the grate bars. The blow gases are burned in combustion chamber 32 in the same manner as during the preceding "blow," and after entering carburetor 34 through conduit 38 their combustion is completed by means of secondary air introduced through an inlet 86 and control valve 88. After most of the remaining potential heat of these blow gases has been absorbed by the refractory fillings of carburetor 34 and superheater 36, their products of combustion are exhausted through stack valve 54 and stack 52.

During the succeeding water gas run valve 54 at the top of superheater is closed, and steam or, preferably, water is admitted into the top of the superheater through an inlet 90 by opening a valve 92. The steam generated by contacting water with the highly heated refractory filling of superheater 36 continues to take up superheat during its downward passage through the superheater and upward passage through carburetor 34, and is then admitted into the generator either through conduit 38, by opening hot valve 40, or through conduit 44 by opening valve 48. The water gas produced during the up run leaves the generator through connection 16 and is passed by hot valve 18 into the top of carburetor 12. Likewise the water gas produced during the down run through the fuel bed is led out through conduit 46 and is passed by hot valve 50 into the top of carburetor 12. The current of water gas, superheated by absorption of heat derived from radiant energy stored in the top layers of the fuel bed and by the walls of combustion chamber 32 during the previous blast cycle, enters the top of carburetor 12 and is met by a spray of carburetting oil introduced from a pipe 94 through distributors 96. The heat carried by the water gas supports the vaporization and also the "fixation" of this oil, and as the current of water gas, enriched with the gaseous hydrocarbon products of this oil "fixation", passes downwardly through the refractory filling of carburetor 12 and upwardly through that of superheater 14, a large proportion of its superheat is transferred to the refractory fillings and the gas exits through valve 26 and offtake 24 into the seal pot and foul gas main at a relatively low temperature.

The fuel used in the process, such as coke, anthracite or bituminous coal, may be admitted either periodically or continuously in small portions into the top of the generator from a hopper 98 through a charging neck 100, by opening a charging gate 102. As this raw fuel falls through combustion chamber 32 onto the top of the fuel bed, the top level of which is preferably always kept below the secondary air inlet nostrils 66, it is immediately exposed to the high temperatures resulting from the projection of radiant energy liberated by combustion of the blow gases in chamber 32 into the top layers of the fuel bed. Accordingly this raw fuel is subjected to carbonizing temperatures almost instantly, and its volatile components are liberated very rapidly. In order to retain these volatile components so far as possible in the water gas, the operation of fuel charging is preferably restricted to the periods of water gas making, as otherwise the valuable enriching qualities of the volatile components of the fuel would be lost by combustion with the blow gases. When powdered fuel is employed it is preferably admitted to the generator only during that portion of the run in which steam is admitted at the top of the generator and passed downwardly through the fuel column, for with this method of fuel charging the fuel bed can serve as a screen to catch undecomposed carbon before it enters the carburetor and superheated elements. In using powdered fuel with the present type of apparatus it might be advantageously admitted into the carburetors 12 and 34 through secondary air inlets 68 and 86, or preferably directly into combustion chamber 32 through a pair of fuel injectors or nostrils 104 which extend into ducts 16 and 38 from supply hoppers 106. By this arrangement coke breeze or other finely divided fuel can be carried into the fuel bed of the generator by the current of steam and the fuel can be given a high degree of preheat before it reaches the fuel bed by absorption of heat regenerated from the blast gases and stored in the carburetors and/or in the heat radiation zone of the combustion chamber.

The apparatus embodying the preferred form of the present invention is based on the arrangement of the standard water gas set. Likewise the plan of operation resembles that generally employed in water gas manufacture, insofar as is consistent with thermally efficient operation. By employing supplemental carburetor and superheater elements it is possible with the apparatus embodying the present invention to carry on preheating of blast air and regeneration of the heat of the blow gases simultaneously. Likewise with this apparatus arrangement it is possible to superheat the steam and at the same time to carry on the carburetion of the water gas with hydrocarbon oils. However, without some further addition to the apparatus there is no provision whereby the additional step, namely that of regenerating some of the heat carried out of the generator by the water gas in the form of sensible heat, can be recovered and utilized. To accomplish this the standard set has been further modified in construction by raising the roof of the standard generator and installing inlets for secondary air, whereby a combustion chamber is provided between the radiation arch roof of the generator and the normal upper level of the fuel bed therein. By the addition of this radiation arch combustion chamber to the standard set, together with the supplemental carburetor and superheater and the auxiliary connections previously described, most of the disadvantages of the standard water gas set have been overcome, and the present apparatus for water gas manufacture is thermally efficient and economical and in operation follows a substantially balanced thermal plan or cycle.

The inlet for water or steam 74, the inlet for air 82, the exhaust valve 20, and the offtake 24 and valve 26 at the top of the standard superheater have their exact counterparts respectively in the water inlet 90, the air inlet 60, the valve 54, and the offtake 56 with valve 58 at the top of supplemental superheater 36. Likewise the secondary air inlet 68 and the oil inlet 94 at the top of the carburetor 12 have their counterparts in secondary air inlet 86 and oil pipe 78 at the top of the supplemental carburetor 34. The conduits 16 and 46 with their respective hot valves 18 and 50, by which air and steam can be introduced into the generator through combustion chamber 32 or beneath the grates 42, and by which either up run or down run water gas can be led from the generator into the top of carburetor 12, correspond in every detail and functional purpose with the conduits 38 and 44 and the corresponding hot valves 40 and 48 which connect the generator with carburetor 34.

In operation the standard and supplemental sets of carburetor and superheater elements are used alternately for preheating blast air and for regenerating potential heat from the blow gases, and in the same way during the gas making runs these two sets of regenerative elements are used alternately in generating and superheating make steam and in carburetting and regenerating the sensible heat of the carburetted water gas. The direction of flow of blast air and of blow gases through the entire apparatus is preferably in one direction throughout one entire period of air blowing, and in the opposite direction throughout the next period of air blowing. However, while the blast air is preferably admitted through conduits 44 or 46 into the base of the generator and passed continuously upward through the column of fuel therein, this up-blow may be varied by at intervals introducing air at the top of the generator through conduits 16 and 38 and passing it in a downwardly direction through the fuel column.

Likewise the make steam and make gases are passed through the entire apparatus in a direction opposite to that taken by the blast air and blow gases during the preceding blow cycle and the direction of flow is preferably in the same general direction during the whole period of the run. However, while in the same general direction, the path taken by the steam and by the water gas through the generator itself may be reversed during the runs by at intervals varying the usual up-run with a down-run during which the steam is introduced at the top of the generator and passed downwardly through the fuel bed. Hot valves 18 and 40 in conduits 16 and 38 respectively are the means by which down blast air and down run steam may be introduced into the generator from carburetors 12 and 34 respectively, and are likewise the means by which water gas made during the more common up-runs is led from the generator into the corresponding carburetor units. Likewise hot valves 50 in conduit 46 and hot valves 48 in conduit 44 control the admission of up blast air and up run steam into the generator and also the removal of down run gas from the base of the generator. Hot valve 50 will always be closed when hot valve 18 is open, and vice versa, and likewise hot valves 40 and 48 will never be opened simultaneously. When hot valves 48 and 18 are open hot valves 50 and 40 will necessarily be closed; while when hot valves 50 and 40 are open, hot valves 48 and 18 will remain closed. Valve 26 in offtake 24 will be open only during the gas making period in which enriched water gas is passed from the generator through carburetor 12 and superheater 14. During this period stack valve 20 and valve 76 in inlet 74, valve 84 in inlet 82, and valve 58 in offtake 56 will be closed. Valve 58 in offtake 56 will be open only during the gas making period in which water gas is passed from the generator in series through carburetor 34 and superheater 36. During this period stack valve 54 and valve 92 in inlet 90, valve 62 in inlet 60, and valve 26 in offtake 24 will be closed.

When both up and down runs are used during the same gas making period, the gas making period is preferably closed with an up run so that the temperature of the fuel in the lower portion of the column adjacent the grates 42 can be materially lowered and its heat returned to the upper zones of the fuel bed by the up-run water gas before the end of the run and before the grates are shaken. When a down-run is used it is preferably for only a short period, for the reason that if allowed to continue very long most of the heat stored in the upper layers of the fuel bed and in combustion chamber 32 from the previous blast cycle would be carried downwardly into the lower portion of the fuel bed and accordingly superheating of the up run water gas sufficiently to support their carburetion with hydrocarbon oils would be less easily accomplished.

By burning the blow gases in combustion chamber 32, and by storing a part of the heat thus liberated within the confines of the generator and fuel bed, the heat normally carried over into carburetor and superheater elements by the blow gases is materially reduced. As a result it is possible to recover substantially all the remaining potential heat of the blow gases in the linings of the carburetor and superheater elements, and the temperature of the upper portion of the superheater adjacent the exhaust valve will not be so high but that the products of combustion of the blow gases can exit at a relatively low temperature. One advantage of reducing the total heat carried out of the generator to the carburetor and superheater elements by the blow gases is that preheat may be given to the blast air and superheat to the make steam in the superheater and carburetor without overheating either above the temperature at which they would do material injury to the grate bars of the generator. Another advantage is that the heat that is carried over is so much less that it can be almost all returned to the generator by the make steam and by the blast air respectively, during the make run and during the blast cycle immediately succeeding the period of heat regeneration, so that the elements are substantially cooled off before the beginning of the run, and are in fine condition for service in carburetion of the make gases and in regeneration of a substantial portion of the heat of the enriched gases before their exit from the apparatus.

By burning the blow gases in the combustion chamber at the top of the generator and projecting heat thus liberated as radiant energy into the top layers of the fuel bed, a substantial part of the potential heat of the blow gases is recovered and stored within the generator at a point where it can be most effectively used for superheating water gas as it leaves the top of the fuel bed and before it enters the carburetor. By imparting superheat to the water gas at this point in degree sufficient to support carburetion with mineral oil it is no longer necessary to impart high degrees of heat to the linings of the carburetor and superheater elements immediately prior to the gas making runs, and accordingly the comparatively cool fillings of the carburetor and superheater will serve effectively to regenerate heat from the make gases.

By regulating the amount of secondary air admitted into the top of the generator through nostrils 66 any proportionate part of the blow gases can be burned in the top of the generator, and such as are not burned in the generator can be burned by secondary air admitted through inlet 68 and valve 70 at the top of carburetor 12, or through inlet 86 and valve 88 at the top of carburetor 34. The degree to which the blow gases are burned in combustion chamber 32 is preferably controlled so that the heat stored in the walls of the combustion chamber and in the top layers of the fuel bed will superheat the make gases sufficiently to permit vaporization of the carburetting oils and the fixation of their vapors into gaseous hydrocarbons.

This may be accomplished wholly by the sensible heat carried by the make gases, thus permitting completion of the gas enrichment within the carburetor elements and leaving the superheater elements for the regeneration of heat from the enriched gas.

Due to a better balanced thermal equilibrium the present method of generating water gas will require less primary blast air and less secondary air per unit of production, and accordingly the capacity of the generator per unit of cross section will be materially higher, and the loss of potential heat with the exhaust blast gases will be very much lower than has been obtained heretofore in commercial practice.

In case it is found necessary to use high gravity oils for carburetting the water gas the generator may preferably be fitted up with an oil spray 108 in conjunction with the fuel charging inlets 104 by means of which the high gravity oil can be sprayed directly onto the hot upper layers of the fuel bed during the gas making runs. In this way the high gravity oil can be almost instantaneously and completely gasified by absorption of heat derived from radiant energy stored in the upper layers of the fuel bed, and the gaseous hydrocarbons produced will be immediately picked up by the stream of water gas produced in the lower portion of the fuel bed and carried into carburetor and superheater elements. By this arrangement the ash and carbon residues of the oil gasification are deposited in the fuel bed rather than in the brick work linings of the carburetor, and the linings of the carburetor and superheater are therefore kept clean and in the best condition for regenerating sensible heat of the enriched make gases.

The term "preheaters" as used in the claims is intended as a generic term to cover any of the modern types of recuperators, regenerators or similar heat exchanging apparatus such as may be suitably utilized for carburetting, heat regenerating and gas preheating purposes.

The invention having been thus described, what is claimed as new is:

1. The method of making water gas, which comprises intermittently blasting primary air through a bed of ignited fuel in a gas generator to raise its temperature to incandescence, preheating the blast air before introducing it into the fuel bed, burning the blow gases thereby formed within the generator, storing heat liberated by combustion of the blow gases in the upper portion of the fuel bed and in preheaters and exhausting relatively cool products of combustion to the atmosphere, generating and superheating steam by absorption of heat from said preheaters and passing the superheated steam upwardly through the incandescent fuel bed between periods of air blasting and thereby generating water gas, superheating the water gas by absorption of heat stored in the upper layers of the fuel bed, and utilizing the heat in the superheated water gas for preheating the blast air of a subsequent cycle.

2. The method of making water gas, which comprises intermittently passing primary air through a hot preheater thereby preheating it and thence upwardly through a bed of ignited fuel in a gas generator and thereby generating blow gases, introducing secondary air into the generator immediately above the fuel bed and thereby burning the blow gases, passing the products of secondary combustion through a second preheater to regenerate the heat thereof and exhausting them to the atmosphere, passing steam in a reverse direction through the last-named preheater and thence upwardly through the bed of fuel in the generator and thereby generating water gas, superheating the water gas thus produced by absorption of heat radiated into the upper portion of the generator and fuel bed during the burning of the blow gases, carburetting the superheated water gas with hydrocarbons, and passing the enriched gas through the first-named preheater to cool the gas and thence into a foul gas main.

3. The method of making combustible gas, which comprises alternately passing primary blast air and superheated make steam through a bed of ignited fuel in a gas generator and thereby generating blow gases and water gas in turn, introducing secondary air into the generator above the fuel bed and thereby burning the blow gases, completing combustion of the blow gases and regenerating their potential heat in preheaters, utilizing the heat regenerated in the preheaters to generate and superheat make steam, passing the steam alternately downward and upward through the bed of fuel in the generator, regenerating the sensible heat of the water gas in auxiliary preheaters, regenerating the potential heat of the blow gases made during the succeeding blast cycle in the auxiliary preheaters, and reversing the direction of flow of blast air and make steam through the entire apparatus after each gas making run.

4. The method of making water gas, which comprises intermittently blasting preheated primary air through a bed of ignited fuel in a gas generator and thereby generating blow gases, introducing secondary air into the top of the generator above the fuel bed and thereby burning the blow gases, storing a substantial part of the heat liberated by combustion of the blow gases in the walls and roof of the generator and in the upper layers of the fuel bed and exhausting the products of combustion through preheaters, passing steam in a reverse direction through the preheaters and through the top of the generator and fuel bed to absorb superheat, passing the superheated steam through the blast zone of the fuel bed to generate water gas, and introducing fuel into the top of the generator during the water gas cycle to take on preheat by absorption of heat regenerated from the blast gases.

In testimony whereof I affix my signature.

ALFRED JOHNSON.

CERTIFICATE OF CORRECTION.

Patent No. 1,848,015.　　　　　　　　　　　　　　　　　　March 1, 1932

ALFRED JOHNSON.

It is hereby certified that error appears in the printed specification of the above numbered patent requiring correction as follows: Page 7, strike out lines 6 to 28, comprising claim 2, and for claims now appearing as numbers "3 and 4" respectively, read 2 and 3; and that the said Letters Patent should be read with these corrections therein that the same may conform to the record of the case in the Patent Office.

Signed and sealed this 12th day of July, A. D. 1932.

(Seal)　　　　　　　　　　　　　　　　　　　　　　M. J. Moore,
　　　　　　　　　　　　　　　　　　　　　Acting Commissioner of Patents.